United States Patent
DeMeuse

(10) Patent No.: US 6,485,817 B1
(45) Date of Patent: Nov. 26, 2002

(54) HIGH OTR POLYOLEFIN FILMS

(75) Inventor: Mark T. DeMeuse, Hockessin, DE (US)

(73) Assignee: Applied Extrusion Technologies, Inc., Peabody, MA (US)

( * ) Notice: Subject to any disclaimer, the term of this patent is extended or adjusted under 35 U.S.C. 154(b) by 77 days.

(21) Appl. No.: 09/723,452

(22) Filed: Nov. 28, 2000

Related U.S. Application Data

(63) Continuation-in-part of application No. 09/141,291, filed on Aug. 27, 1998, now abandoned.

(51) Int. Cl.$^7$ .............................. B32B 7/02; B32B 27/32
(52) U.S. Cl. ........................ 428/213; 428/515; 428/516; 428/910
(58) Field of Search ................................. 428/213, 515, 428/516, 910

(56) References Cited

U.S. PATENT DOCUMENTS 4,410,582 A * 10/1983 Tsunashima et al. ........ 428/212

FOREIGN PATENT DOCUMENTS

EP 0243 965 A2 * 11/1987

* cited by examiner

Primary Examiner—D. S. Nakarani
(74) Attorney, Agent, or Firm—Caesar, Rivise, Bernstein, Cohen & Pokotilow, Ltd.

(57) ABSTRACT

Oriented polyolefin composite films are disclosed comprised of core including an olefin heteropolymer core consisting essentially of an ethylene/propylene copolymer having less than 10%, by weight, ethylene and having a skin layer on at least one of its surfaces comprised of a high modulus polypropylene. These films are characterized by an oxygen and moisture vapor transmission rate greater than that of conventional polypropylene films and a tensile modulus great enough to permit their use as packaging films. This combination of properties makes these films suitable for packaging fresh produce items which continue to respire after they are harvested.

12 Claims, No Drawings

HIGH OTR POLYOLEFIN FILMS

RELATED APPLICATION

This application is a continuation-in-part appliction of Ser. No. 09/141,291, filed on Aug. 27, 1998, abandoned, entitled "High OTR Polyolefin Films."

FIELD OF THE INVENTION

This invention relates to polyolefin films having certain unique properties. Specifically, it relates to clear polyolefin films that exhibit an increased oxygen transmission property as compared to conventional polypropylene films known to the art.

BACKGROUND INFORMATION

It is known that, for many applications, particularly packaging applications, polypropylene is less than totally satisfactory due to a relatively high permeability to oxygen. A great amount of effort has been expended in recent years to decrease the oxygen transmission characteristics of polypropylene. The best results to date have been obtained by metallization of the films.

There are, however, some applications in which a greater and controllable oxygen transmission rate is desired. This is particularly the case when fresh fruits, vegetables and flowers are to be packaged as these products continue to respire after they are packaged. Absence or insufficient levels of oxygen, which occurs as the oxygen originally present in the package is consumed, leads to premature senescence and spoilage of the products. At the same time, respiration leads to a build-up of moisture in the package, which can also lead to spoilage of the product if the moisture cannot escape from the package. It is thus desirable to provide polypropylene packaging wherein the oxygen content can be replenished as necessary and from which the moisture can escape.

Conventional polypropylene films of a thickness required for most applications, whether monolayer or composite, have oxygen and moisture vapor permeability values that are not sufficient to allow the optimum oxygen and moisture levels to be maintained in a sealed package containing products of the type mentioned.

It is known to prepare microporous films based on an opaque polymer mixture comprised of about 45% to 55% homopolypropylene and 55% to 45% of a copolymer of propylene and ethylene containing about 2% to 5% ethylene by weight, which films have greater oxygen permeability than films made of plain polypropylene. This polymer mixture is blended into a mixture comprised of about 40 to 60% of the polymer mixture and 60 to 40% of certain inorganic filler materials and is subjected to biaxial orientation. The filler material selected is one that causes voiding of the polymer matrix during the drawing operation. Exemplary of such voiding pigments are barium sulfate, calcium carbonate, silica, diatomaceous earth and titania. Calcium carbonate is said to be the preferred filler material. Anderson, U.S. Pat. No. 4,842,875, teaches the use of such films in the preparation of controlled atmosphere containers for use with fresh vegetables, fruits and flowers.

Microporous films known to the art as described above function reasonably well for preparing films having increased and, to a degree, controllable oxygen and moisture vapor permeability. However, the voiding pigments employed in the prior art are of a particle size large enough and are employed in concentrations great enough to result in formation of voids of such a size that the resultant films are almost totally opaque.

Polyethylene is also known to have sufficiently great oxygen transmission qualities to permit produce items to continue respiring after being packaged, but polyethylene films do not have sufficient tensile modulus to permit their use in most packaging applications.

U.S. Pat. No. 4,410,582, issued to Tsunashima et al., is directed principally to finger-tearable multilayer structures effectively usable as an adhesive tape substrate and in other applications. Although this patent discloses the use of a nucleated polypropylene in the skin, the disclosed purpose of adding the nucleating agent is to improve the transparency of the film. There is no disclosure of providing a nucleated polypropylene having any required properties for improving the OTR of the film, let alone providing the high modulus properties required in the instant invention. In fact, there is no disclosure that controlling the modulus properties of the polypropylene in the skin has any effect on OTR. It is stated in column 8, lines 15–20 that the substrate may be usable as a packaging film if a paper or metal foil is bonded to one or both surfaces. However, employing a metallized layer tends to reduce the OTR; making the films undesirable for packaging applications in which a high OTR is required.

European publication No. 0 243 965, describing an invention by Tsutomu, et al., discloses a multilayer packaging film for packaging fresh vegetables and fruits and including an antifogging additive in at least one surface layer that also has heat sealing properties. Although the surface layer is described generally as being composed of a homopolymer or copolymer of alpha-olefins, there is no suggestion that the alpha olefin should, or could by a high modulus polypropylene required for use in the instant invention. Moreover, the film disclosed in the '965 publication teaches away from forming the core of the multilayer film from a polyolefin copolymer, by itself (see page 17).

BRIEF DESCRIPTION OF THE INVENTION

In accordance with this invention, there are provided transparent biaxially oriented polyolefin films based on high OTR olefin heteropolymers, which films have a stiffness (i.e. tensile modulus) sufficient to have self-supporting, stand-alone characteristics such that they can be employed as packaging films. These films have increased oxygen and moisture vapor permeability, as compared with conventional, unmodified polypropylene film, and are substantially clearer than are films possessing these permeability characteristics that have heretofore been known to the art.

In accordance with this invention, there are provided transparent composite, oriented polyolefin films comprised of a core layer and at least one skin layer, said core layer being a heteropolymer of at least two α-monoolefins, and having a thickness sufficient to give the composite structure stand-alone characteristics; said at least one skin layer being a high modulus polypropylene of a thickness such that its oxygen transmission rate (OTR) is higher than that of the core layer and the total composite structure having an oxygen transmission rate (OTR) of at least about 200 cc/100 sq. in/day/atmosphere, a moisture vapor transmission rate (MVTR) of at least about 0.5 gram/sq. in./day, and a tensile modulus of at least 185,000 psi in both the machine direction and cross-machine direction of the film. Most preferably the heteropolymer employed in this invention is an ethylene/propylene copolymer having less than 10% ethylene, by weight, and most preferably having about 4.5–6% ethylene, by weight.

The core layer in the composite films of this invention has a sufficient thickness to be "self-supporting" (hereinafter defined), independent of the surface layers.

The composite films of the invention are characterized by having oxygen and moisture vapor permeability substantially greater than those of conventional films based on polypropylene wherein the thickest layer of the film, i.e., the core layer, is polypropylene. The films of the invention are also clear and transparent so that a product packaged therein can be visually inspected for its quality without opening the package. At the same time, they have tensile properties that make them suitable for use as packaging films.

DETAILED DESCRIPTION OF THE INVENTION

When used in this disclosure, the term "α-monoolefin" refers to a linear unsaturated hydrocarbon monomer having one carbon-carbon double bond, which double bond is located at the end of the linear chain. The term is intended to include any such monomer having 6 carbon atoms or less, including ethylene and propylene.

The term "heteropolymer" is intended to mean an olefin polymer containing at least two α-monoolefins. Typical of such heteropolymers are ethylene/propylene copolymers having less than 10% by weight ethylene and more preferably about 4.5 to 6% by weight of ethylene. Although other heteropolymers, i.e., butene--propylene copolymers containing about 5 to 34% by weight of butene-1 and ethylene--propylene--butene-1 terpolymers may be usable, they are less preferred than the aforementioned ethylene/propylene copolymers. Such heteropolymers can be converted to films and can be oriented within a temperature range comparable to the temperature range within which polypropylene is satisfactorily drawn to effect orientation.

The term "self supporting" in reference to a film or core layer means that the film or core layer can support itself without the aid of any additional supporting layers to provide the necessary strength and body and it can readily be handled without being adhered to another substrate. Such a film or core may also be referred to as a "stand-alone" film or core, as the case may be.

Heteropolymers such as those described are well known in the polyolefin art and are widely used as heat seal layers on commercial polypropylene composite films. In those applications, the heteropolymers comprise very thin layers on the surface of a relatively thick polypropylene core. The layers thus employed are so thin that, unless they are adhered to a core layer, they cannot be wound into a roll, nor can they be used for any purpose that requires them to be handled except when they are adhered to a supporting substrate., i.e. they are not self supporting and do not have stand-alone properties. As a general rule, when the heteropolymers are intended to serve as sealing layers, they are applied to the polypropylene core in layers of no more than about 0.1 mil in thickness, whereas the thicker polypropylene layer is usually about 0.70 to about 0.80 mils.

The heteropolymers are inherently more permeable to oxygen and moisture than is polypropylene per se. For example, a one mil layer of a typical oriented polypropylene exhibits OTR, measured according to ASTM D3985-81, on the order of about 125 to 150 cc/100 sq. in./atmosphere/day. A one mil layer of a copolymer of propylene containing 6% ethylene exhibits OTR on the order of about 300 to 350 cc/100 sq. in./atmosphere/day. However, when used as sealing layers, these latter materials are in such thin layers that they have virtually no effect on the OTR of a film to which they may be applied since the lower OTR of the polypropylene core does not permit all the oxygen that can pass through the sealant layer to pass through the polypropylene layer.

It has not heretofore been possible, however, to take advantage of the greater OTR of the heteropolymers in packaging of fresh produce items since the heteropolymers have not heretofore been shown to be amenable to the production of packaging films. These materials lack the higher degree of stereoregularity characteristic of polypropylene and thus they do not possess sufficient tensile strength and stiffness to form stand-alone films that can be employed as packaging films.

In accordance with this invention, it has been found that, by combining the heteropolymer with a high modulus polypropylene species, a clear, self supporting film can be prepared that has stand-alone properties and a sufficiently high OTR that it can be used for packaging fresh fruits, flowers and vegetables that require a continuous refreshing of the oxygen supply in the closed package. The high modulus polypropylene species can be combined with the heteropolymer by layering a core of the heteropolymer on either or both of its surfaces with a skin of the high modulus polypropylene species. Such composite films are clear, self-supporting films having a sufficiently high OTR that they can be used for packaging fresh fruits, flowers and vegetables that require a continuous refreshing of the oxygen supply in the closed package. Most preferably the sole polymer in the core is the heteropolymer and most preferably the heteropolymer consists essentially of an ethylene/propylene copolymer having less than 10%, by weight, ethylene, and more preferably about 4.5–6% by weight ethylene.

As stated above, when the heteropolymers employed in this invention are applied as heat seal layers on a polypropylene core, their greater OTR has virtually no effect on the OTR of the composite, i.e., the composite OTR is unchanged from that of a polypropylene core of the same thickness without the skins. This appears to be a rather straight-forward observation, readily explainable by the substantially greater thickness of the core and its substantially lower OTR, which does not permit all of the oxygen that can pass through the skin in a specified time period to continue on through the core in that same time period.

It is known that OTR is, to a degree, dependent on the thickness of a polyolefin film and increases in almost a straight line relationship to the thickness as the thickness decreases. Thus, by decreasing the thickness of a polypropylene layer and increasing that of a heteropolymer layer, a point will be reached at which the OTR of the polypropylene layer will be greater than that of the heteropolymer layer. At this point, based on the observation of the OTR effect of heteropolymer skins on a polypropylene core, one would anticipate that the OTR of the composite would be that of the heteropolymer core.

However, upon examining the results of the OTR testing of the films prepared in carrying out the work that led to this application, it was found that, when a thin polypropylene layer (or layers) is (are) applied to a high OTR core, the OTR of the composite is not the same as would have been expected of the core layer without the polypropylene skin(s). The OTR of the composite is less than that of the core layer alone even though the polypropylene skin layers are so thin as to have an OTR greater than that of the core.

This effect is explainable by the fact that, even though the OTR of the polypropylene skin layers is now greater than that of the heteropolymer core, the difference between the OTR values of the core and the skins is not nearly so great as that between the polypropylene core and the heteropolymer skins of conventional films. In films according to the invention, the time required for the oxygen to pass through the skin layer becomes a factor with respect to the composite OTR of the film. Since the OTR of a heteropolymer skin on prior art films is so high, the time required for oxygen to pass through is so small that it has a negligible effect on the composite OTR.

Since OTR is a rate, it can be represented by distance (i.e., film thickness) divided by time required for oxygen to pass through the film, i.e $$OTR = \frac{thickness}{time}$$

Accordingly, the time required is equal to the thickness divided by the OTR, i.e.

$$Time = \frac{thickness}{OTR}$$

For a three layer film, the composite OTR is the composite film thickness divided by the sum of the times required for oxygen to pass through the individual layers, i.e.

$$compositeOTR = \frac{thickness}{\frac{T_1}{OTR_1} + \frac{T_2}{OTR_2} + \frac{T_3}{OTR_3}}$$

Where $T_1$ and $T_3$ represent the thicknesses of the skin layers and $T_2$ represents the thickness of the core layer of the composite while $OTR_1$ and $OTR_3$ and represent the OTR values of the corresponding skin layers and $OTR_2$ represents the OTR value of the core layer. Since the OTR and the thickness of the individual layers can be easily measured, it is not necessary to know the absolute time required for the oxygen to pass through each layer.

With the above knowledge, it is now possible to tailor films to have a predetermined OTR for packaging specific items of produce. If one has sufficient information concerning the respiration rate of a product, one can vary the layer thicknesses to approximate that respiration rate sufficiently accurately for successful commercial use.

As noted earlier, the preferred heteropolymers usable in this invention are ethylene/propylene copolymers having less than 10%, by weight, ethylene and most preferably about 4.5–6% by weight ethylene. The use of such ethylene/propylene copolymers allows for the attainment of higher film OTR values than are possible with, for example, butene/propylene copolymers employing a percentage, by weight, of butene that is the same as the percentage, by weight, of ethylene employed in the ethylene/propylene copolymers. Thus, with the same amount of ethylene as butene in the copolymer, the OTR values are much higher in the films employing the ethylene/propylene copolymer. It is possible to achieve the same or similar OTR value by using either a butene/propylene copolymer or an ethylene/propylene copolymer; however, the percentage by weight of butene employed in the butene/propylene copolymer needs to be greater that the percentage by weight of ethylene employed in the ethylene/propylene copolymer. The use of a greater percentage of butene in the butene/propylene copolymer causes an undesired loss in the stiffness of the film.

In order for the films to have a stiffness sufficient to permit their use as packaging films, a high modulus polypropylene or polypropylene composition is employed in the skin layer. Reference to "high modulus polypropylene" means a polypropylene or a polypropylene composition, which, when formed into a 70 gauge (0.7 mil thick) film drawn 7× by 7× on simultaneous draw equipment provides the film with a modulus value of at least about 450,000 psi in both the machine direction and cross-machine direction of the film. The most preferred high modulus polypropylene in this invention is a polypropylene homopolymer having a melt flow rate (MFR) in the range of about 2–4 dg/minute. Such a homopolymer is extremely well suited for the production of biaxially oriented film in accordance with this invention.

Suitable and preferred polypropylenes for use in the skin layer, which exhibit the required high modulus characteristics include the newly developed high crystallinity polypropylene. This material, available under several trade names, is defined as having an isotactic index of at least 93%, i.e., the polymer contains no more than about 7%, and preferably no more than about 2 to 6% xylene soluble materials. Typical high crystallinity polypropylene is further characterized by higher stiffness, greater surface hardness, lower heat deflection at high temperatures, lower heat shrinkage and better creep properties than conventional isotactic polypropylenes, which have isotactic index generally less than 93%. Typical high crystallinity polypropylenes that can be employed include ACCPRO 9117, ACCPRO 9119 and ACCPRO 9218 (all available from Amoco Polymers, Alpharetta, Ga.); Chisso HF 5010 and Chisso XF 2805 (available from Chisso Chemical Co. Ltd., Tokyo, Japan) and FF035C, a nucleated isotactic polypropylene (available from Aristech Chemical Co., Pittsburgh, Pa.).

Reference to the specified isotactic index throughout this application refers to the value determined by NMR spectroscopy.

High modulus polypropylenes also include blends of conventional isotactic polypropylene with low molecular weight hydrocarbon resins. Inclusion of about 5% or more of the low molecular weight hydrocarbon resin in a conventional polypropylene increases the modulus to the desired high modulus range. The upper limit of low molecular weight resin is about 25% by weight.

The low molecular weight hydrocarbon resins are hydrogenated or unhydrogenated resins derived from olefin monomers, such as the resins derived from terpene monomers, coal tar fractions and petroleum feedstocks. In general, the low molecular weight resins are characterized by a molecular weight less than about 5000, a $T_g$ of about 50 to 100° C. and a softening point less than about 140° C. Suitable resins include those prepared from terpene monomers (e.g., limonene, alpha and beta pinene, such as Piccolyte resins from Hercules Incorporated, Wilmington, Del., and Zonatac resins from Arizona Chemical Company, Panama City, Fla.). Other low molecular weight resins are prepared from hydrocarbon monomers and mixtures thereof, such as $C_5$ monomers (e.g., piperylene, cyclopentene, cyclopentadiene, and isoprene), oligomerized $C_5$ monomers, particularly the thermally oligomerized $C_5$ monomers such as the hydrogenated thermally oligomerized cyclopentadiene resins sold under the trade name Escorez (for example Escorez 5300) by Exxon Chemical Co. of Baytown, Tex. Others are prepared from $C_9$ monomers, particularly the monomers derived from $C_9$ petroleum fractions which are mixtures of aromatics, including styrene, methyl styrene, alpha methyl styrene, vinyl naphthalene, the indenes and methyl indenes and, additionally, pure aromatic monomers, including styrene, α-methyl-styrene and vinyltoluene. Examples of these resins include hydrogenated α-methyl styrene--vinyl toluene resins sold under the trade name Regalrez by Hercules Incorporated of Wilmington, Del. The hydrogenated $C_9$ and pure monomer resins are preferred. Particularly preferred are the hydrogenated cyclopentadiene resins and the hydrogenated aromatic resins derived from pure aromatic monomers, e.g., the hydrogenated α-methyl styrene--vinyltoluene copolymers.

Another polypropylene having the high modulus required of the skin layers of the films of this invention can be prepared by blending conventional commercial isotactic polypropylene prepared via Ziegler-Natta catalysis with a polypropylene prepared by use of a metallocene catalyst. Such blends and films prepared therewith are described in copending and commonly assigned U.S. patent application Ser. No. 09/055,389, filed Apr. 6, 1998. In the referenced application, it is shown that very significant increases in tensile modulus are realized when these polymer types are blended. Such modulus improvements are realized with blends containing 10 to 90% of the Ziegler-Natta polymer.

Films according to the invention are generally of a total thickness from about 0.5 to about 2 mil. A high modulus polypropylene skin layer can be applied to one or both surfaces of the heteropolymer core. Preferably, it will be applied to both surfaces and, most preferably, the skin thickness will be the same on both sides.

Although the results vary with different heteropolymer cores, the combination of increased OTR and satisfactory tensile modulus sought in the films of the invention is generally realized when the polypropylene skin layer or layers constitute about 14 to 56% of the thickness of the composite structure. Preferably a skin layer will comprise about 30 to 56% of the thickness of the composite structure. It is surprising to find that a skin layer of high modulus polypropylene as thin as that employed in the films of this invention can impart to the entire film the modulus required of a packaging film. When a skin layer is applied to both surfaces, the two layers should each be of a thickness such that its OTR is greater than that of the core layer.

As suggested hereinabove, the films of this invention have several properties that make them unique and desirable for the packaging of fresh produce products. First, they are of a stiffness required of packaging materials generally. Thus, they exhibit a tensile modulus greater than about 185,000 psi in both the machine-direction and cross-machine direction. While this is not as high as the modulus of conventional polypropylene films in which the polypropylene is the primary component, it is sufficient for many packaging applications. In addition, the films exhibit an OTR greater than 200 cc/100 sq. in./day/atmosphere; a level at which the packaged product can continue to respire for a reasonable time after it has been harvested, thus assuring a reasonable shelf life for the product. Thirdly, the films are found to have a moisture vapor transmission rate greater than that of conventional polypropylene films, whereby they permit the escape of moisture generated by the produce product's continued respiration after it is packaged. Finally, the films retain a high degree of clarity and transparency, so that the packaged product can be inspected for its appearance by the potential purchaser The multilayer films of the invention can be prepared by coextrusion, extrusion coating or lamination. The preferred method is coextrusion wherein the various layers are extruded simultaneously through a multi-layer die and immediately brought together in the molten state so that they are permanently bonded upon solidifying.

Film forming and drawing to effect orientation can be carried out by conventional techniques, i.e. the well known tubular (bubble) process or the equally well known tenter process can be employed. When the films are prepared by the bubble process, the draw is effected simultaneously and uniformly in the machine and cross directions to about 3× to 7× and preferably 5× to 7×. Using the tenter process, drawing is carried out sequentially to about 3× to 7× in the machine direction and to about 7× to 11× in the cross direction.

The heteropolymer core of the composite film can have the high modulus skin on one or both of its surfaces. In the embodiment of the invention wherein the high modulus polypropylene skin is present on only one surface of the heteropolymer core, the other surface can have no skin at all or it can have a different functional layer. Functional layers that can be employed as the other layer include such layers as, e.g, a heat seal layer. Such a layer will be of a material of lower melting point than the core so that when heat is applied to effect the seal, the orientation of the core layer will not be disturbed. A commonly used heat seal layer is comprised of a terpolymer of propylene, ethylene and butene-1, unless, of course, that is the core heteropolymer. Other polymers that can be employed as a heat seal layer include polyvinyl or polyvinylidene chloride.

Another frequently used functional layer is a cold seal layer. In this layer, the polymer component will frequently be the same as that of the core layer, though, here again, it need not be the same. To prepare a cold seal film, a cold seal adhesive, such as, e.g., a rubber adhesive is applied to the surface of the oriented film.

Another commonly used functional layer is a slip layer to facilitate handling of the film during later converting operations. Such a layer is comprised of a polymer containing a slip agent such as a high molecular weight fatty acid amide. A functional layer may also contain an antiblock additive to facilitate unwinding of the film after it has been wound at the terminus of the film manufacturing process. These types of layers can be comprised of polypropylene if the layer is more oxygen permeable than the heteropolymer core and accordingly will not decrease the OTR of the total film structure. Preferably, such layers will be made of the same heteropolymer as is employed in the core layer.

The invention is illustrated in the following Examples.

EXAMPLE 1

Three-layer films having a core comprised of a 6% ethylene copolymer with propylene (Fina 9470 from Fina Chemical Co., Houston, Tex.) and two surface layers, each comprised of a nucleated isotactic polypropylene (Aristech FF 035C from Aristech Chemical Co. Pittsburgh, Pa.) were prepared. At the same time, two control films comprised of a single layer of the 6% ethylene copolymer (Control 1) and the nucleated polypropylene (Control 2) were prepared. The films were extruded through a three-layer die onto a casting roll maintained between about 211 and 213° F. at a casting speed of about 3.1 feet/minute. All of the films were drawn 6× by 6× using a T.M. Long stretcher. The three layer film was drawn at 150° C., the copolymer film (Control 1) at 115° C. and the nucleated polypropylene film (Control 2) at 150° C. Relevant physical properties of the films are presented in Table 1 below.

TABLE 1

| Example | Thickness | Skin Thick.[1] | Modulus[2] | OTR[3] | MVTR[4] | % Haze |
|---|---|---|---|---|---|---|
| 1 | 0.62 mil | 34.8% | 187,857 psi | 363.7 | 0.901 | 0.49 |
| 1a | 0.68 mil | 52.2% | 246,088 psi | 308.6 | 0.716 | 0.60 |

TABLE 1-continued

| Example | Thickness | Skin Thick.[1] | Modulus[2] | OTR[3] | MVTR[4] | % Haze |
|---|---|---|---|---|---|---|
| Control 1 | 0.77 mil | — | 122,973 psi | 449.4 | 1.103 | 0.44 |
| Control 2 | 0.64 mil | — | 431,870 psi | 184.5 | 0.451 | 0.58 |

[1] As percentage of total film structure
[2] psi by Instron Tensile Tester
[3] cc/100 sq. in/atmosphere/day (ASTM D3985-81)
[4] grams/100 sq. in./24 hrs. (ASTM D372)

The significant increase in both the OTR and the MVTR are clearly seen from the data presented in Table 1. The increased stiffness as compared to that of the film comprised only of the heteropolymer is also clearly seen. The film denoted as Example 1, while it is marginal in stiffness for use for some packaging purposes, would serve effectively as a material for making the panel on a modified atmosphere package according to the Anderson patent referenced above. The low haze values indicate a high degree of transparency.

EXAMPLE 2

The procedure substantially according to Example 1 was repeated with a copolymer of ethylene and propylene containing 4.5% ethylene (Fina 8573 from Fina Chemical Co.). The polypropylene was the same as was used in Example 1.

Three-layer films having a core comprised of the 4.5%% ethylene copolymer with propylene (Fina 8573 from Fina Chemical Co., Houston, Tex.) and two surface layers comprised of a nucleated isotactic polypropylene (Aristech FF035C) were prepared. Similarly, two control films comprised of a single layer of the nucleated polypropylene and the 4.5% ethylene copolymer, respectively, were prepared. The three-layer films and the polypropylene control were cast on a casting roll maintained between about 211 and 213° F. at a casting speed of about 3.1 feet/minute. The copolymer film was cast at 133° F. All of the films were drawn 6x by 6x using a T.M. Long stretcher. The three layer films, designated 2a, 2b and 2c, were drawn at 125° C., 125° C. and 135° C., respectively. The nucleated polypropylene control film (Control 1) was drawn at 145° C. and the copolymer control (Control 2) at 125° C. Relevant physical properties are presented in Table 2, below.

TABLE 2

| Example | Thickness | Skin Thick. | Modulus | OTR | MVTR | % Haze |
|---|---|---|---|---|---|---|
| 2a | 0.74 mil | 17.8 | 215,263 | 247.2 | 0.743 | 0.53 |
| 2b | 0.65 mil | 34.8 | 303,950 | 215.2 | 0.662 | 0.45 |
| 2c | 0.67 mil | 52.2 | 309,239 | 219.4 | 0.648 | 0.50 |
| Control 1 | 0.63 mil | — | 480,448 | 129.9 | 0.424 | 0.50 |
| Control 2 | 0.72 mil | — | 177,648 | 336.7 | 0.990 | 0.18 |

EXAMPLE 3

A third series of three layer films was prepared wherein the heteropolymer core layer was a copolymer of butene-1 and propylene containing 34% of the butene-1. The skin layers were of nucleated isotactic polypropylene. Two such films were prepared, of which one, designated 3a, had skin layers equal to 34.8% of the total film thickness. The other, designated 3b, had skin layers equal to 52.2% of total film thickness. Both films were cast at 211° F. and 3.1 feet/minute. Both films were oriented 6x by 6x, 3a at 140° C. and 3b at 145 ° C. No controls were run with these films the copolymer alone does not draw sufficiently well to produce any meaningful data.

Property data for these films are presented in Table 3.

TABLE 3

| Example | Thickness | Skin Thick, | Modulus | OTR | MVTR | % HAZE |
|---|---|---|---|---|---|---|
| 3a | 0.68 mil | 34.8 | 212,178 | 273.4 | 0.773 | 0.6 |
| 3b | 0.67 mil | 52.2 | 256,469 | 256.1 | 0.715 | 0.46 |

Here again, it is seen that the films exhibit increased oxygen and moisture vapor permeability. At the same time, they exhibit sufficient stiffness to be useful as packaging materials.

What is claimed is:

1. A transparent composite, oriented polyolefin film comprising a first layer and at least a second skin layer, said first layer being a heteropolymer consisting essentially of an ethylene/propylene copolymer including less than 10%, by weight, ethylene, said at least second skin layer being a high tensile modulus polypropylene of a thickness such that its oxygen transmission rate (OTR) is higher than that of the first layer and the total composite structure having an oxygen transmission rate (OTR) of at least 200 cc/100 sq. in./day/atmosphere, a moisture vapor transmission rate (MVTR) of at least 0.5 gram/sq. in./day, and a tensile modulus of at least 185,000 psi in both the machine-direction and the cross-machine direction.

2. The film according to claim 1 wherein the second skin layer comprises about 14 to 56% of the thickness of the total composite film structure.

3. The film according to claim 2 wherein the high tensile modulus polypropylene is selected from the group consisting of polypropylene having an isotactic index greater than 93%, nucleated polypropylenes, blends of polypropylene with about 5 to 25% by weight of a hydrocarbon resin having molecular weight less than 5,000, and blends of Ziegler-Natta polypropylene and metallocene-catalyzed polypropylene.

4. The film according to claim 3 wherein the heteropolymer first layer is a copolymer of ethylene and propylene containing about 4.5 to 6% by weight of ethylene.

5. The film according to claim 2 wherein the heteropolymer first layer is a copolymer of ethylene and propylene containing about 4.5 to 6% by weight of ethylene.

6. The film according to claim 1 wherein the heteropolymer first layer is a copolymer of ethylene and propylene containing about 4.5 to 6% by weight of ethylene.

7. A transparent composite, oriented polyolefin film comprised of a core layer having a skin layer on each of its surfaces, said core layer being a heteropolymer consisting essentially of an ethylene/propylene copolymer including less than 10%, by weight, ethylene, said skin layers being a high tensile modulus polypropylene of a thickness such that their oxygen transmission rate is higher than that of the core layer and the total composite structure having an oxygen transmission rate of at least 200 cc/100 sq. in./day/ atmosphere, a moisture vapor transmission rate of at least 0.5 gram/sq. in./day, and a tensile modulus of at least 185,000 psi in both the machine-direction and the cross-machine direction.

8. The film according to claim 7 wherein the high modulus skin layers comprise about 14 to 56% of the thickness of the total composite film structure.

9. The film according to claim 8 wherein the high tensile modulus polypropylene is selected from the group consisting of polypropylene having an isotactic index greater than 93%, nucleated polypropylenes, blends of polypropylene with about 5 to 25% by weight of a hydrocarbon resin having molecular weight less than 5,000, and blends of Ziegler-Natta polypropylene with metallocene-catalyzed polypropylene.

10. The film according to claim 9 wherein the heteropolymer core layer is a copolymer of ethylene and propylene containing about 4.5 to 6% by weight of ethylene.

11. The film according to claim 8 wherein the heteropolymer core layer is a copolymer of ethylene and propylene containing about 4.5 to 6% by weight of ethylene.

12. The film according to claim 7 wherein the heteropolymer core layer is a copolymer of ethylene and propylene containing about 4.5 to 6% by weight of ethylene.

\* \* \* \* \*